US010230168B2

(12) United States Patent
Cao (10) Patent No.: US 10,230,168 B2
(45) Date of Patent: Mar. 12, 2019

(54) CO-FREQUENCY FULL-DUPLEX ANTENNA STRUCTURE AND ELECTRONIC APPARATUS FOR WIRELESS COMMUNICATIONS (71) Applicant: Yulong Computer Telecommunication Scientific (Shenzhen) Co., Ltd., Shenzhen, Guangdong (CN)

(72) Inventor: Yiqing Cao, Guangdong (CN)

(73) Assignee: Nanchang Coolpad Intelligent Technology Company Limited, Nanchang (CN)

( * ) Notice: Subject to any disclaimer, the term of this patent is extended or adjusted under 35 U.S.C. 154(b) by 140 days.

(21) Appl. No.: 15/328,159

(22) PCT Filed: Jul. 31, 2014

(86) PCT No.: PCT/CN2014/083487
§ 371 (c)(1),
(2) Date: Jan. 23, 2017

(87) PCT Pub. No.: WO2016/015314
PCT Pub. Date: Feb. 4, 2016

(65) Prior Publication Data
US 2017/0214148 A1    Jul. 27, 2017

(51) Int. Cl.
*H01Q 19/10* (2006.01)
*H01Q 15/14* (2006.01)
*H01Q 9/04* (2006.01)
*H04B 7/12* (2006.01)
*H04L 5/14* (2006.01)
*H01Q 1/52* (2006.01)
(Continued)

(52) U.S. Cl.
CPC ............. *H01Q 15/14* (2013.01); *H01Q 1/525* (2013.01); *H01Q 9/0485* (2013.01); *H04B 7/12* (2013.01); *H04L 5/14* (2013.01); *H04B 1/0475* (2013.01); *H04B 15/00* (2013.01)

(58) Field of Classification Search
CPC ...... H01Q 15/14; H01Q 1/525; H01Q 9/0485; H04B 1/0475
USPC ........................................................ 343/834
See application file for complete search history.

(56) References Cited

U.S. PATENT DOCUMENTS 4,144,535 A    3/1979  Dragone
9,014,553 B2*  4/2015  Weichert ............. H04B 10/071
                                                        385/89

FOREIGN PATENT DOCUMENTS

CN    1241855 A      1/2000
CN    101346637 A    1/2009
(Continued)

*Primary Examiner* — Huedung X Mancuso
(74) *Attorney, Agent, or Firm* — Young Basile Hanlon & MacFarlane, P.C.

(57) ABSTRACT

A co-frequency full-duplex antenna structure includes a receiving antenna, a transmitting antenna for transmitting a signal of a predetermined wavelength, and a signal reflection apparatus for reflecting the signal transmitted by the transmitting antenna, so as to realize that a path difference between a reflected signal formed when the signal transmitted by the transmitting antenna reaches the receiving antenna after being reflected and a direct signal formed when the signal transmitted by the transmitting antenna directly reaches the receiving antenna is an odd number of times as much as one half of the predetermined wavelength.

18 Claims, 6 Drawing Sheets (51) Int. Cl.
　　　*H04B 1/04*　　　(2006.01)
　　　*H04B 15/00*　　　(2006.01)

(56) References Cited

FOREIGN PATENT DOCUMENTS

| | | |
|---|---|---|
| CN | 101741465 A | 6/2010 |
| CN | 103647579 A | 3/2014 |
| CN | 103685098 A | 3/2014 |
| JP | 19930175933 A | 7/1993 |
| WO | 2012106263 A | 8/2012 |
| WO | 2014100989 A | 7/2014 |

\* cited by examiner

CO-FREQUENCY FULL-DUPLEX ANTENNA STRUCTURE AND ELECTRONIC APPARATUS FOR WIRELESS COMMUNICATIONS

TECHNICAL FIELD

The present disclosure relates to communication technology field, and particularly to a co-frequency full-duplex antenna structure and an electronic apparatus for wireless communications.

BACKGROUND

At present, a difficulty of the co-frequency full-duplex technology is how to eliminate self-interference. Methods for interference elimination mainly include antenna interference elimination, radio frequency interference elimination, and digital interference elimination. The antenna interference elimination is used at an antenna end, and is passive interference elimination.

Figure 1:
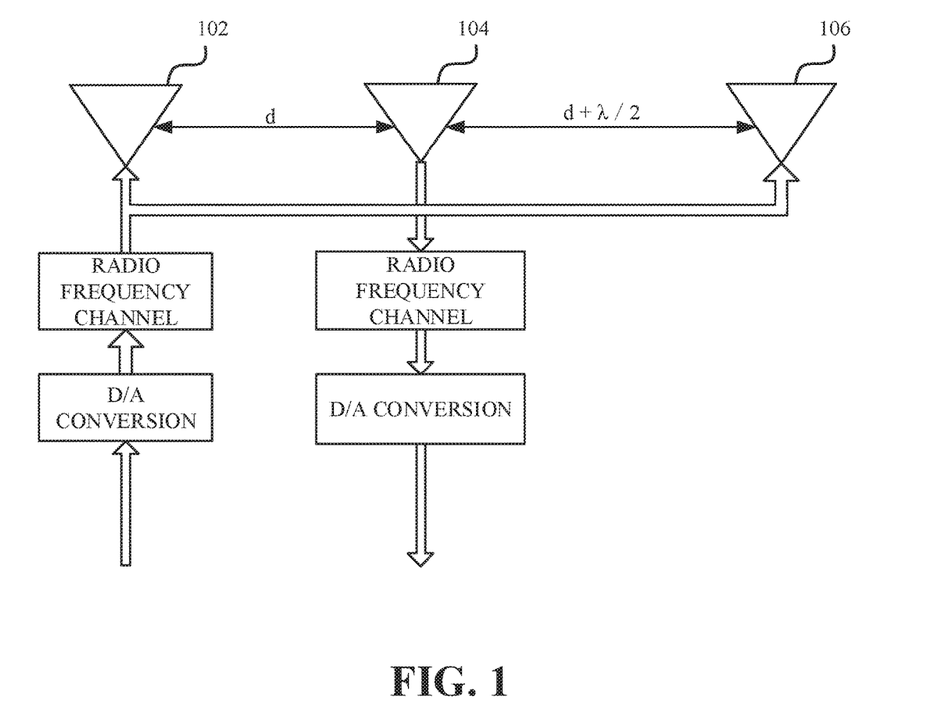
FIG. 1 is a schematic view of a full-duplex antenna structure in the relevant technology.

To realize the antenna interference elimination, the relevant technology proposes a solution, and in the solution, by controlling spatial positions of a receiving antenna and two transmitting antennas, interference of signals of the two transmitting antennas is eliminated at the receiving antenna. In the solution, a transmission signal is divided into two signals, and the two signals are transmitted to the two transmitting antennas respectively. The receiving antenna is arranged between the two transmitting antennas, and a difference between a distance between the receiving antenna and one of the two transmitting antennas and a distance between the receiving antenna and the other of the two transmitting antennas is an odd number of times as much as one half of the wavelength. Specifically, as shown in FIG. 1, if the wavelength of the transmission signal is $\lambda$, the transmission signal is divided into two signals after travelling through a radio frequency channel, and the two signals are transmitted to the two transmitting antennas respectively (that is, the transmitting antenna 102 and the transmitting antenna 106). Wherein, the distance between the transmitting antenna 106 and the receiving antenna 104 is $d+\lambda/2$, the distance between the transmitting antenna 102 and the receiving antenna 104 is d, and one of the two transmission signals is superimposed on the other of the two transmission signals at the receiving antenna 104. As a phase difference of the two transmission signals is $\pi$ due to a path difference of a half of the wavelength, the interference of the superimposed transmission signals can be eliminated, and the strength of self-interference signals can be greatly reduced. Furthermore, when the strength of one of the two transmission signals is much closer to that of the other of the two transmission signals at the receiving antenna, the effect of interference elimination is much better, and the strength of interference of residual signals is much weaker.

In the above technical solution, two transmitting antennas and one receiving antenna are needed. The full-duplex communication mode can be realized, and to a certain degree, the throughput capacity of the system is also increased. However, the transmission signal is divided into two signals and the two signals are transmitted to different antenna channels, as it cannot guarantee that the characteristics of the two transmitting antennas are the same, even if the transmission signals respectively transmitted to the two transmitting antennas are the same, there are also different distortion and loss. Furthermore, the difference between the two signals is random, the greater the difference is, the poor the effect of interference elimination is, and the greater the strength of interference of the residual signals is.

Therefore, under the condition of not adding an active device, how to realize self-interference elimination of antennas, and also how to avoid a poor effect of interference elimination due to the fact that there are random errors in signals transmitted by two transmitting antennas, have become technical problems which are needed to be instantly solved.

SUMMARY

Based on at least one of the above technical problems, the present disclosure provides a co-frequency full-duplex antenna structure. For the structure, without adding an active device, elimination of self-interference of antennas can be realized, and the problems of a poor effect of interference elimination and strong interference of residual signals due to the fact that there are random errors in signals transmitted by two transmitting antennas can be also avoided.

In view of this, the present disclosure provides a co-frequency full-duplex antenna structure which includes: a receiving antenna, a transmitting antenna configured to transmit a signal of a predetermined wavelength, and a signal reflection apparatus configured to reflect the signal transmitted by the transmitting antenna, so as to realize that a path difference between a reflected signal formed when the signal transmitted by the transmitting antenna reaches the receiving antenna after being reflected and a direct signal formed when the signal transmitted by the transmitting antenna directly reaches the receiving antenna is an odd number of times as much as one half of the predetermined wavelength.

In the technical solution, the transmission signal is reflected by the signal reflection apparatus, so as to realize that interference of the reflected signal formed when the signal reflected by the signal reflection apparatus reaches the receiving antenna and the direct signal formed when the signal transmitted by the transmitting antenna directly reaches the receiving antenna is eliminated at the receiving antenna such that the elimination of self-interference of antennas can be realized without adding an active device. Furthermore, as the reflected signal and the direct signal are transmitted by the same antenna, the distortion and loss of the reflected signal and the direct signal are the same. Comparing with a solution of the relevant technology which adopts two transmitting antennas and one receiving antenna, in this technical solution, the structure is simple, and the problems of a poor effect of interference elimination and strong interference of residual signals due to the fact that there are random errors in signals transmitted by two transmitting antennas can be avoided. Wherein, the height of the direct signal and the reflected signal can be the same, and can also be different, and what is needed to be ensured is that the path difference between the reflected signal and the direct signal is an odd number of times as much as one half of the wavelength of the signal transmitted by the transmitting antenna.

According to a preferred solution of the present disclosure, the height of the transmitting antenna is the same as that of the receiving antenna, and the transmitting antenna is perpendicular to a reflection surface of the signal transmitting apparatus.

Under the condition that the height of the transmitting antenna is the same as that of the receiving antenna, and the transmitting antenna is perpendicular to the reflection surface of the signal transmitting apparatus, the distance between the transmitting antenna and the receiving antenna, the height of the transmitting antenna, and the predetermined wavelength satisfy the following equation:

$$(2h)^2 + d^2 = \left(d + n \times \frac{\lambda}{2}\right)^2,$$

wherein, h is the height of the transmitting antenna, d is the distance between the transmitting antenna and the receiving antenna, λ is the predetermined wavelength, n is an odd number.

In the above technical solution, preferably, the reflection surface of the signal reflection apparatus is spherical, and after the signal transmitted by the transmitting antenna is reflected by the reflection surface and is gathered after being reflected, the reflected signal is formed.

In this technical solution, by setting the reflection surface of the signal reflection apparatus to be spherical, power of signals transmitted by the transmitting antenna can be gathered, and great power loss caused by a long path of the reflected signal can be compensated, so as to make sure that the power of the direct signal and the power of the reflected signal which are both received by the receiving antenna are the same, thus an optimal effect of interference elimination can be realized.

In the above technical solution, preferably, a coating for enhancing signal reflection is arranged on the reflection surface of the signal reflection apparatus.

In the technical solution, by arranging the coating for enhancing signal reflection on the reflection surface of the signal reflection apparatus, the problem of that the effect of elimination of interference of the reflection signal and the direct signal is affected by great power loss of the signal transmitted by the transmitting antenna during the reflection process can be avoided.

In the above technical solution, preferably, the coating is arranged on a reflection position of the reflection surface, and the reflected signal is transmitted from the reflection position.

In the technical solution, by just arranging the coating on the reflection position of the reflection surface, coating materials can be reduced, and cost of the product can be reduced.

In the above technical solution, preferably, when the signal transmitted by the transmitting antenna is a broadband signal, a dielectric layer of a specific dispersion property is arranged on the path of the reflected signal, so as to reduce a wavelength difference of signals of different frequencies in the broadband signal.

In this technical solution, the broadband signal includes signals of different frequencies, and the signals of different frequencies have different wavelengths, thus, by setting the dielectric layer of the specific dispersion property, the wavelength difference of the signals of different frequencies in the broadband signal can be compensated as much as possible, and the effect of interference elimination can be enhanced.

In the above technical solution, preferably, the distance between the transmitting antenna and the signal reflection apparatus is greater than or equal to the predetermined distance, so as to form a transmit diversity by the transmitting antenna and the signal reflection apparatus.

Specifically, under the condition of adding the signal reflection apparatus, two transmitting antennas are formed (certainly, when having a number of signal reflection apparatuses, a number of transmitting antennas can be formed), that is, an "origin" transmitting antenna and an "image" transmitting antenna are formed. When a distance between the "origin" transmitting antenna and the "image" transmitting antenna exceeds a certain distance (such as 10 wavelengths), it can make sure that the signal transmitted by the "origin" transmitting antenna and the signal transmitted by the "image" transmitting antenna have an independent fading property, thus the transmit diversity can be constructed.

In the above technical solution, preferably, the distance between the receiving antenna and the signal reflection apparatus is greater than or equal to a predetermined distance, so as to form a received diversity by the receiving antenna and the signal reflection apparatus.

Similarly, under the condition of adding the signal reflection apparatus, two receiving antennas are formed (certainly, when having a number of signal reflection apparatuses, a number of receiving antennas can be formed), that is, an "origin" receiving antenna and an "image" receiving antenna are formed. When a distance between the "origin" receiving antenna and the "image" receiving antenna exceeds a certain distance (such as 10 wavelengths), it can make sure that the signal received by the "origin" receiving antenna and the signal received by the "image" receiving antenna have an independent fading property, thus the received diversity can be constructed.

According to another aspect of the present disclosure, an electronic apparatus for wireless communications is further provided. The electronic apparatus includes the co-frequency full-duplex antenna structure described in any of the above technical solutions.

According to the above technical solutions, without adding an active device, elimination of self-interference of antennas can be realized, and the problems of a poor effect of interference elimination and strong interference of residual signals due to the fact that there are random errors in signals transmitted by two transmitting antennas can be also avoided.

DETAILED DESCRIPTION

To understand the above-mentioned purposes, features and advantages of the present disclosure more clearly, the present disclosure will be further described in detail below in combination with the accompanying drawings and the specific implementations. It should be noted that, the embodiments of the present application and the features in the embodiments may be combined with one another without conflicts.

Many specific details will be described below for sufficiently understanding the present disclosure. However, the present disclosure may also be implemented by adopting other manners different from those described herein. Accordingly, the protection scope of the present disclosure is not limited by the specific embodiments disclosed below.

Figure 2:
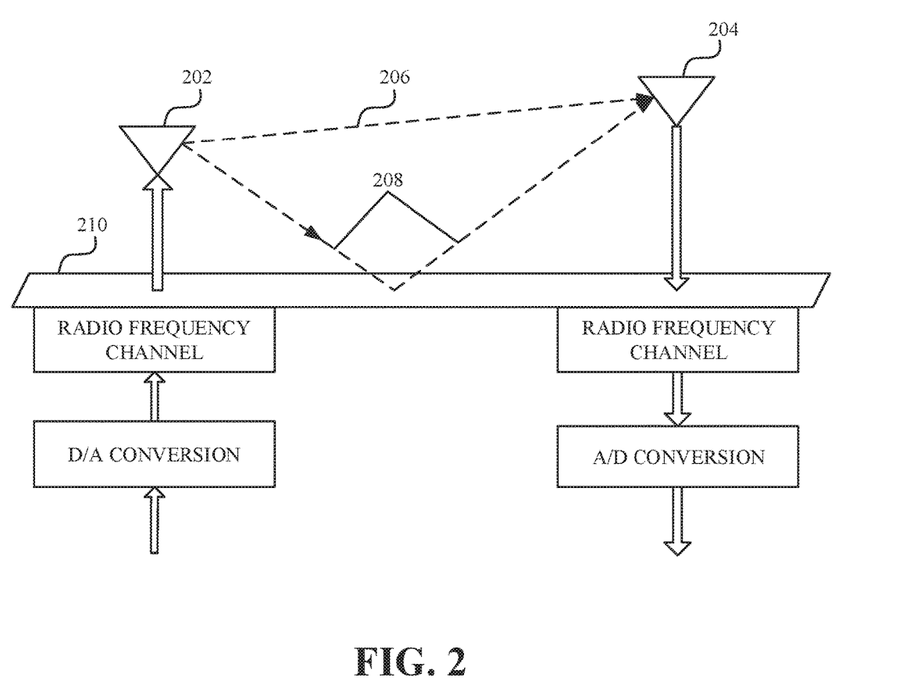
FIG. 2 is a schematic view of a co-frequency full-duplex antenna structure in accordance with an embodiment of the present disclosure.

FIG. 2 is a schematic view of a co-frequency full-duplex antenna structure in accordance with an embodiment of the present disclosure.

As shown in FIG. 2, a co-frequency full-duplex antenna structure in accordance with an embodiment of the present disclosure includes: a receiving antenna 204, a transmitting antenna 202 configured to transmit a signal of a predetermined wavelength, and a signal reflection apparatus 210 configured to reflect the signal transmitted by the transmitting antenna 202, so as to realize that a path difference between a reflected signal 208 formed when the signal transmitted by the transmitting antenna 202 reaches the receiving antenna 204 after being reflected and a direct signal 206 formed when the signal transmitted by the transmitting antenna 202 directly reaches the receiving antenna 204 is an odd number of times as much as one half of the predetermined wavelength.

In this technical solution, the transmission signal is reflected by the signal reflection apparatus 210, so as to realize that interference of the reflected signal 208 formed when the signal reflected by the signal reflection apparatus 210 reaches the receiving antenna 204 and the direct signal 206 formed when the signal transmitted by the transmitting antenna 202 directly reaches the receiving antenna 204 is eliminated at the receiving antenna 204, such that elimination of self-interference of antennas can be realized without adding an active device. Furthermore, as the reflected signal 208 and the direct signal 206 are transmitted by the same antenna, the distortion and loss of the reflected signal 208 and the direct signal 206 are the same. Comparing with a solution of the relevant technology which adopts two transmitting antennas and one receiving antenna, in the technical solution, the structure is simple, and the problems of a poor effect of interference elimination and strong interference of residual signals due to the fact that there are random errors in signals transmitted by two transmitting antennas can be avoided. Wherein, the height of the direct signal 206 and the reflected signal 208 can be the same, and can also be different, and what is needed to be ensured is that a path difference between the reflected signal 208 and the direct signal 206 is an odd number of times as much as one half of the wavelength of the signal transmitted by the transmitting antenna 202.

Figure 3:
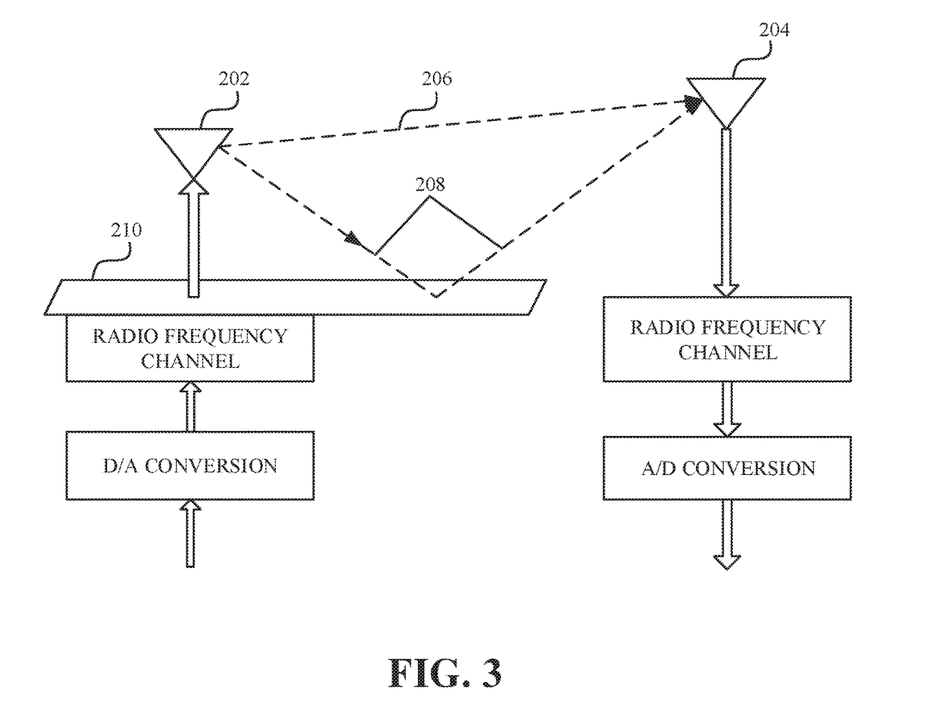
FIG. 3 is a schematic view of a co-frequency full-duplex antenna structure in accordance with another embodiment of the present disclosure.

Wherein, as shown in FIG. 2, the signal reflection apparatus 210 can be arranged both beneath the transmitting antenna 202 and the receiving antenna 204, and can also be arranged just beneath the transmitting antenna 202, which is shown in FIG. 3.

Figure 4:
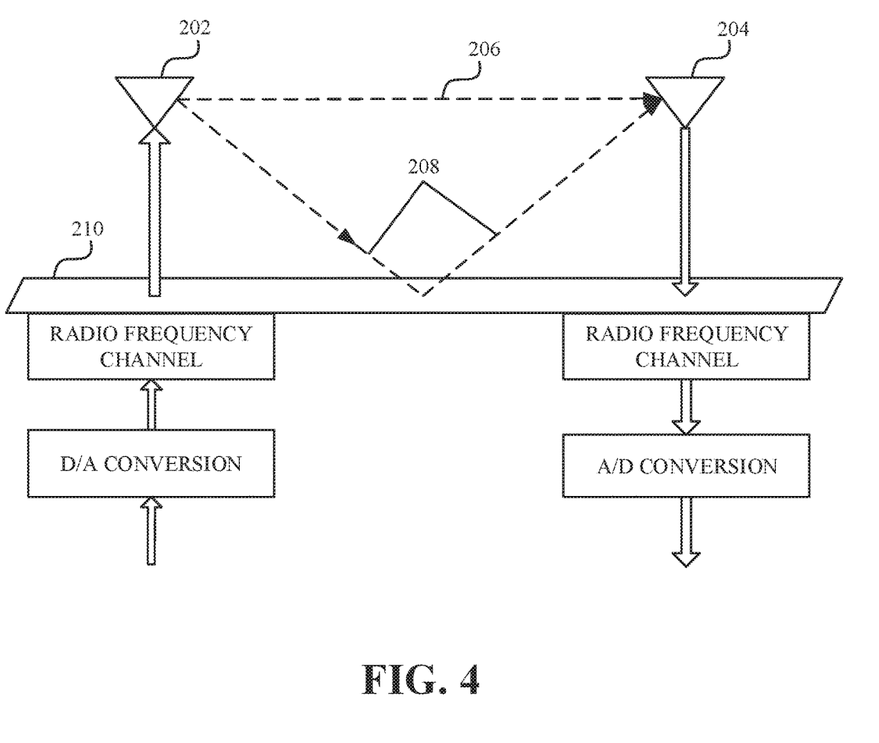
FIG. 4 is a schematic view of a co-frequency full-duplex antenna structure in accordance with another embodiment of the present disclosure.

As shown in FIG. 4, according to a preferred solution of the present disclosure, the height of the transmitting antenna 202 is the same as that of the receiving antenna 204, and the transmitting antenna 202 is perpendicular to a reflection surface of the signal reflection apparatus 210. Certainly, the transmitting antenna 202 may not be arranged to be perpendicular to the reflection surface of the signal reflection apparatus 210.

Figure 5:
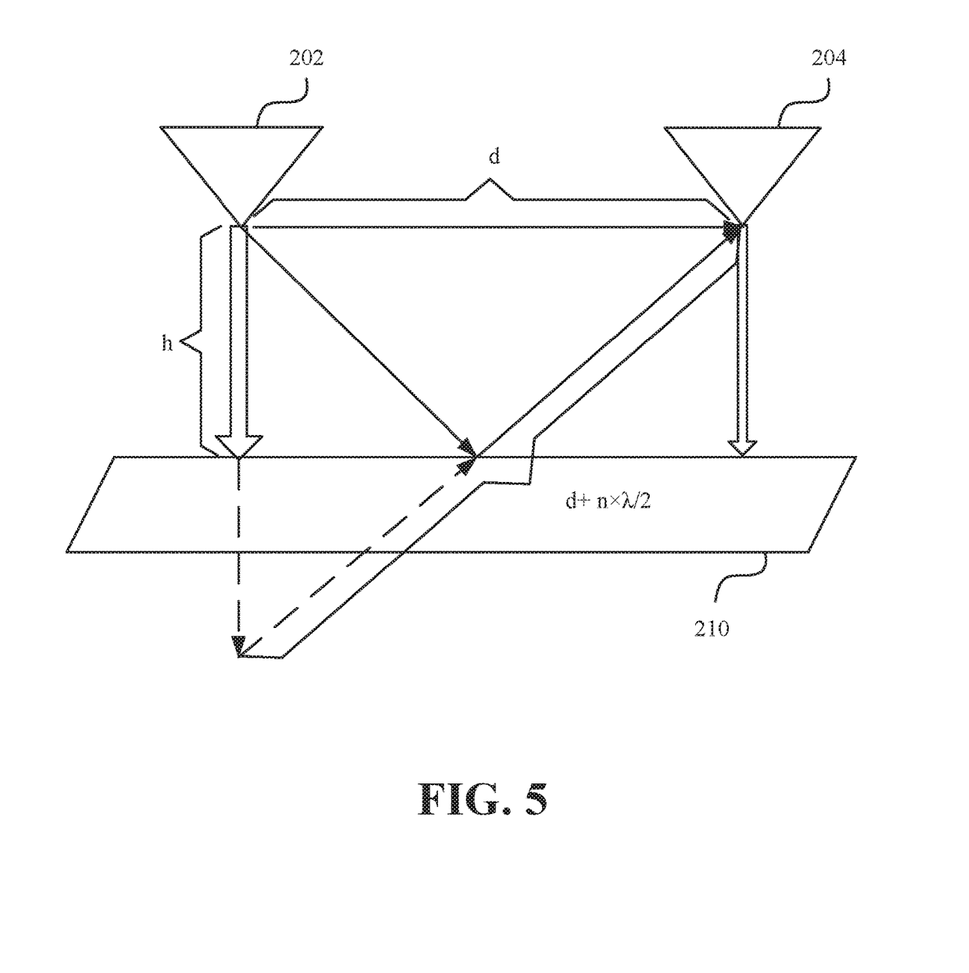
FIG. 5 is a schematic view of a geometrical relationship for realizing interference elimination based on the antenna structure of FIG. 4.

Under the condition that the height of the transmitting antenna 202 is the same as that of the receiving antenna 204, and the transmitting antenna 202 is perpendicular to the reflection surface of the signal reflection apparatus 210, the distance between the transmitting antenna 202 and the receiving antenna 204, the height of the transmitting antenna 202, and the predetermined wavelength satisfy the following equation:

$$(2h)^2 + d^2 = \left(d + n \times \frac{\lambda}{2}\right)^2,$$

wherein, as shown in FIG. 5, h is the height of the transmitting antenna 202, d is the distance between the transmitting antenna 202 and the receiving antenna 204, λ is the predetermined wavelength, and n is an odd number.

To avoid power loss of the reflected signal 208 caused by reflection, following two methods can be adopted.

Implementation Method 1:

The reflection surface of the signal reflection apparatus 210 is spherical (not shown in the figure), and after the signal transmitted by the transmitting antenna 202 is reflected by the reflection surface and is gathered after being reflected, the reflected signal 208 is formed.

In this technical solution, by setting the reflection surface of the signal reflection apparatus 210 to be spherical, power of signals transmitted by the transmitting antenna 202 can be gathered, and great power loss caused by a long path of the reflected signal 208 can be compensated, so as to make sure that the power of the direct signal 206 and the power of the reflected signal 208 which are both received by the receiving antenna 204 are the same, thus an optimal effect of interference elimination can be realized.

Implementation Method 2:

A coating for enhancing signal reflection (not shown in the figure) is arranged on the reflection surface of the signal reflection apparatus 210.

In the technical solution, by arranging the coating for enhancing signal reflection on the reflection surface of the signal reflection apparatus 210, the problem that the effect of elimination of interference of the reflected signal 208 and the direct signal 206 is affected by great power loss of the signal transmitted by the transmitting antenna 202 during the reflection process can be avoided.

In the above technical solution, preferably, the coating is arranged on a reflection position of the reflection surface, and the reflected signal 208 is transmitted from the reflection position.

In the technical solution, by just arranging the coating on the reflection position of the reflection surface, coating materials can be reduced, and cost of the product can be reduced.

In the above technical solution, preferably, when the signal transmitted by the transmitting antenna 202 is a broadband signal, a dielectric layer of a specific dispersion property is arranged on the path of the reflected signal 208, so as to reduce a wavelength difference of signals of different frequencies in the broadband signal.

In the above technical solution, the broadband signal includes signals of different frequencies, and the signals of different frequencies have different wavelengths, thus, by setting the dielectric layer of the specific dispersion property, the wavelength difference of the signals of different frequencies in the broadband signal can be compensated as much as possible, and the effect of interference elimination can be further enhanced.

In the above technical solution, preferably, the distance between the transmitting antenna 202 and the signal reflection apparatus 210 is greater than or equal to a predetermined distance, so as to form a transmit diversity by the transmitting antenna 202 and the signal reflection apparatus 210.

Specifically, under the condition of adding the signal reflection apparatus 210, two transmitting antennas 202 are formed (certainly, when having a number of signal reflection apparatuses 210, a number of transmitting antennas 202 can be formed), that is, an "origin" transmitting antenna 202 and an "image" transmitting antenna 202 are formed. When a distance between the "origin" transmitting antenna 202 and the "image" transmitting antenna 202 exceeds a certain distance (such as 10 wavelengths), it can make sure that the signal transmitted by the "origin" transmitting antenna 202 and the signal transmitted by the "image" transmitting antenna 202 have an independent fading property, thus the transmit diversity can be constructed.

In the above technical solution, preferably, the distance between the receiving antenna 204 and the signal reflection apparatus 210 is greater than or equal to a predetermined distance, so as to form a received diversity by the receiving antenna 204 and the signal reflection apparatus 210.

Similarly, under the condition of adding the signal reflection apparatus 210, two receiving antennas 204 are formed (certainly, when having a number of signal reflection apparatuses 210, a number of receiving antennas 204 can be formed), that is, an "origin" receiving antenna 204 and an "image" receiving antenna 204 are formed. When a distance between the "origin" receiving antenna 204 and the "image" receiving antenna 204 exceeds a certain distance (such as 10 wavelengths), it can make sure that the signal received by the "origin" receiving antenna 202 and the signal received by the "image" receiving antenna 202 have an independent fading property, thus the received diversity can be constructed.

In a specific configuration, the distance between the transmitting antenna 202 and the receiving antenna 204 can be configured according to the requirement of the effect of interference elimination. Wherein, the relationship between the effect of interference elimination and the path of the direct signal is shown in FIG. 6.

Figure 6:
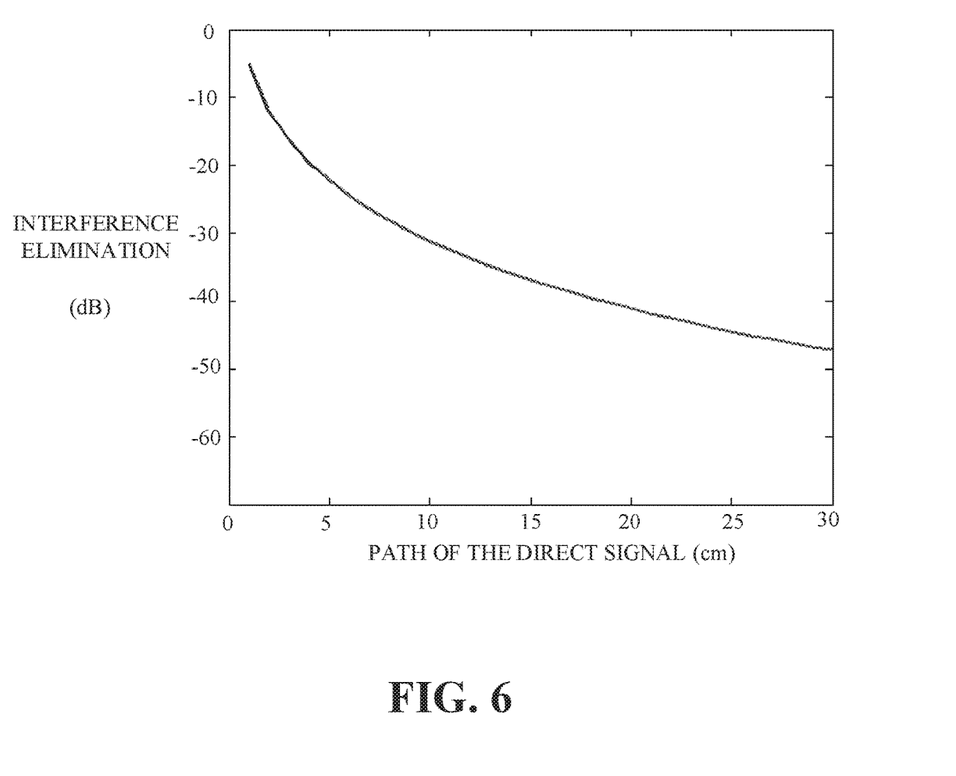
FIG. 6 is a schematic view of a relationship between the distance of a direct signal to a receiving antenna and effect of interference elimination in accordance with an embodiment of the present disclosure.

As shown in FIG. 6, the horizontal axis represents the path of the direct signal, and when the height of the transmitting antenna 202 is the same as that of the receiving antenna 204, the horizontal axis represents the distance between the two antennas. The vertical axis represents the effect of interference elimination. From FIG. 6, it can be seen that the effect of interference elimination becomes better with the increase of the path of the direct signal for the reason that the difference between the half wavelength loss of the direct signal and the half wavelength loss of the reflected signal decreases with the increase of the distance, and the amplitude of the direct signal is much closer to that of the reflected signal, the better the effect of interference elimination is. The horizontal distance between the two antennas cannot be increased without limit, therefore, according to the needs of engineering practice, the horizontal distance can be appropriately selected by considering the effect of interference elimination and the size of the co-frequency full-duplex antenna structure.

The present disclosure further provides an electronic apparatus for wireless communications. The electronic apparatus includes the co-frequency full-duplex antenna structure described in any of the above figures.

The above specifically illustrates the technical solution of the present disclosure in conjunction with the accompanying drawings. In the relevant technology, two transmitting antennas and one receiving antenna are needed to realize the full-duplex communication mode. However, the transmission signals are transmitted to different antenna channels, as it cannot guarantee that the characteristics of the two transmitting antennas are the same, even if the transmission signals respectively transmitted to two transmitting antennas are the same, there are different distortion and loss. Furthermore, the difference between the two signals is random, the greater the difference is, the poor the effect of interference elimination is, and the greater the strength of interference of the residual signals is. Therefore, the present disclosure provides a new co-frequency full-duplex antenna structure, and in the structure, without adding an active device, elimination of self-interference of antennas can be realized, and the problems of a poor effect of interference elimination and strong interference of the residual signals due to the fact that there are random errors in signals transmitted by two transmitting antennas can also be avoided.

The foregoing descriptions are merely preferred embodiments of the present disclosure, rather than limiting the present disclosure. Various modifications and alterations may be made to the present disclosure for those skilled in the art. Any modification, equivalent substitution, improvement or the like made within the spirit and principle of the present disclosure shall fall into the protection scope of the present disclosure.

What is claimed is:

1. A structure for a co-frequency full-duplex antenna, comprising:
   a receiving antenna;
   a transmitting antenna configured to transmit a signal of a predetermined wavelength; and
   a signal reflection apparatus configured to reflect the signal transmitted by the transmitting antenna to realize that a path difference between a reflected signal formed when the signal transmitted by the transmitting antenna reaches the receiving antenna after being reflected and a direct signal formed when the signal transmitted by the transmitting antenna directly reaches the receiving antenna is an odd number of times as much as one half of the predetermined wavelength,
   wherein a distance between the transmitting antenna and the receiving antenna, the height of the transmitting antenna, and the predetermined wavelength satisfy the following equation:

$$(2h)^2 + d^2 = \left(d + n \times \frac{\lambda}{2}\right)^2,$$

wherein h is the height of the transmitting antenna, d is the distance between the transmitting antenna and the receiving antenna, $\lambda$ is the predetermined wavelength, and n is an odd number.

2. The structure of claim 1, wherein a height of the transmitting antenna is the same as a height of the receiving antenna.

3. The structure of claim 2, wherein the transmitting antenna is perpendicular to a reflection surface of the signal reflection apparatus.

4. The structure of claim 1, wherein a reflection surface of the signal reflection apparatus is spherical, and the reflected signal is formed after the signal transmitted by the transmitting antenna is reflected by the reflection surface and gathered after being reflected.

5. The structure of claim 1, wherein a coating for enhancing signal reflection is arranged on a reflection surface of the signal reflection apparatus.

6. The structure of claim 5, wherein the coating is arranged on a reflection position of the reflection surface, and the reflected signal is transmitted from the reflection position.

7. The structure of claim 1, wherein when the signal transmitted by the transmitting antenna is a broadband signal, a dielectric layer of a specific dispersion property is arranged on a path of the reflected signal to reduce a wavelength difference between signals of different frequencies in the broadband signal.

8. The structure of claim 1, wherein a distance between the transmitting antenna and the signal reflection apparatus is greater than or equal to a predetermined distance to form a transmit diversity by the transmitting antenna and the signal reflection apparatus.

9. The structure of claim 1, wherein a distance between the receiving antenna and the signal reflection apparatus is greater than or equal to a predetermined distance to form a received diversity by the receiving antenna and the signal reflection apparatus.

10. An apparatus for wireless communications, comprising:
   a co-frequency full-duplex antenna structure comprising:
      a receiving antenna;
      a transmitting antenna configured to transmit a signal of a predetermined wavelength; and
      a signal reflection apparatus configured to reflect the signal transmitted by the transmitting antenna to realize that a path difference between a reflected signal formed when the signal transmitted by the transmitting antenna reaches the receiving antenna after being reflected and a direct signal formed when the signal transmitted by the transmitting antenna directly reaches the receiving antenna is an odd number of times as much as one half of the predetermined wavelength,
      wherein a distance between the transmitting antenna and the receiving antenna, a height of the transmitting antenna, and the predetermined wavelength satisfy the following equation:

$$(2h)^2 + d^2 = \left(d + n \times \frac{\lambda}{2}\right)^2,$$

wherein h is the height of the transmitting antenna, d is the distance between the transmitting antenna and the receiving antenna, $\lambda$ is the predetermined wavelength, and n is an odd number.

11. The apparatus of claim 10, wherein a height of the transmitting antenna is the same as a height of the receiving antenna.

12. The apparatus of claim 10, wherein the transmitting antenna is perpendicular to a reflection surface of the signal reflection apparatus.

13. The apparatus of claim 10, wherein a reflection surface of the signal reflection apparatus is spherical, and the reflected signal is formed after the signal transmitted by the transmitting antenna is reflected by the reflection surface and gathered after being reflected.

14. The apparatus of claim 10, wherein a coating for enhancing signal reflection is arranged on a reflection surface of the signal reflection apparatus.

15. The apparatus of claim 14, wherein the coating is arranged on a reflection position of the reflection surface, and the reflected signal is transmitted from the reflection position.

16. The apparatus of claim 10, wherein when the signal transmitted by the transmitting antenna is a broadband signal, a dielectric layer of a specific dispersion property is arranged on a path of the reflected signal to reduce a wavelength difference between signals of different frequencies in the broadband signal.

17. The apparatus of claim 10, wherein a distance between the transmitting antenna and the signal reflection apparatus is greater than or equal to a predetermined distance to form a transmit diversity by the transmitting antenna and the signal reflection apparatus.

18. The apparatus of claim 10, wherein a distance between the receiving antenna and the signal reflection apparatus is greater than or equal to a predetermined distance to form a received diversity by the receiving antenna and the signal reflection apparatus.

* * * * *